(12) United States Patent
Castell Martínez et al.

(10) Patent No.: US 8,981,587 B2
(45) Date of Patent: Mar. 17, 2015

(54) WIND TURBINE

(71) Applicant: Alstom Renewable Technologies, Grenoble (FR)

(72) Inventors: Daniel Castell Martínez, Barcelona (ES); Carlos Casanovas Bermejo, Barcelona (ES); Santiago Canedo Pardo, Barcelona (ES)

(73) Assignee: Alstom Renewable Technologies, Grenoble (FR)

( * ) Notice: Subject to any disclaimer, the term of this patent is extended or adjusted under 35 U.S.C. 154(b) by 0 days.

(21) Appl. No.: 14/304,680

(22) Filed: Jun. 13, 2014

(65) Prior Publication Data

US 2014/0312625 A1    Oct. 23, 2014

Related U.S. Application Data

(63) Continuation of application No. 13/386,977, filed as application No. PCT/EP2011/052152 on Feb. 14, 2011, now Pat. No. 8,786,124.

(30) Foreign Application Priority Data

Jul. 12, 2010   (EP) ..................................... 10382189

(51) Int. Cl.
*F03D 9/00* (2006.01)
*H02P 9/04* (2006.01)
*F03D 11/02* (2006.01)

(52) U.S. Cl.
CPC ................ *F03D 11/02* (2013.01); *F03D 9/002* (2013.01)
USPC ............................................. 290/55; 290/44

(58) Field of Classification Search
CPC ........................... F03D 11/028; F05B 2260/96
USPC ...... 416/201 R, 204 A, 244 R, 244 A, 245 R, 416/245 A; 290/43, 44, 53, 55
See application file for complete search history.

(56) References Cited

U.S. PATENT DOCUMENTS

| 2006/0152014 | A1 | 7/2006 | Grant | |
|---|---|---|---|---|
| 2009/0243301 | A1* | 10/2009 | Longtin et al. | 290/55 |
| 2010/0264664 | A1* | 10/2010 | Lauke | 290/55 |

FOREIGN PATENT DOCUMENTS

| DE | 29522190 | 1/2001 |
|---|---|---|
| DE | 10044262 | 3/2002 |
| DE | 10255745 | 6/2004 |
| DE | 102004030929 | 10/2005 |
| EP | 1566543 | 2/2005 |
| EP | 1855001 | 11/2007 |
| EP | 2172647 | 10/2008 |

(Continued)

*Primary Examiner* — Tulsidas C Patel
*Assistant Examiner* — Thomas Quigley
(74) *Attorney, Agent, or Firm* — Squire Patton Boggs (US) LLP

(57) ABSTRACT

A wind turbine that includes a rotor and a generator is described. The rotor includes a rotor hub that is rotatably mounted on a frame and one or more rotor blades. The generator includes a generator stator and a generator rotor with a carrying structure that carries magnetic or electromagnetic elements. One or more circumferentially arranged substantially axial protrusions that extend into the generator rotor carrying structure are attached to the rotor. Flexible couplings are arranged between one or more of the axial protrusions and the carrying structure.

20 Claims, 6 Drawing Sheets

(56) References Cited

FOREIGN PATENT DOCUMENTS

| WO | WO 0159296 | 8/2001 |
| WO | WO 0302394 | 3/2003 |
| WO | WO 2005103489 | 11/2005 |
| WO | WO 2007119953 | 10/2007 |

* cited by examiner

WIND TURBINE

CROSS-REFERENCE TO RELATED APPLICATIONS

This application is a continuation of U.S. application Ser. No. 13/386,977, filed Jan. 25, 2012, which is a U.S. National Stage application of PCT Application No. PCT/EP2011/052152 entitled "Wind Turbine", filed Feb. 14, 2011 which claims priority to European Patent Application No. 10382189.8 entitled "Wind Turbine" filed Jul. 12, 2010 the disclosures of each of which are hereby incorporated herein in their entirety by reference.

BACKGROUND

Embodiments of the invention relate to a wind turbine. Modern wind turbines are commonly used to supply electricity into the electrical grid. Wind turbines of this kind generally comprise a rotor with a rotor hub and a plurality of blades. The rotor is set into rotation under the influence of the wind on the blades. The rotation of the rotor shaft drives the generator rotor either directly ("directly driven") or through the use of a gearbox.

Gearboxes form one of the most maintenance-intensive components of the wind turbine. They need to be inspected regularly and do not always fulfill their expected service life; the gearbox or some of its parts sometimes need to be replaced prematurely. This is due to the high loads and fluctuating loads to which a gearbox may be subjected. Particularly the bending loads on the blades, which may be transmitted through the rotor shaft to the gearbox can be damaging.

Direct drive wind turbines such as known from e.g. WO 2005/103489, do not suffer from the problems related to the gearbox. However, since there is no speed increase, the generator shaft rotates very slowly. As a consequence, a large and relatively expensive generator is generally needed to be able to generate electricity in an effective way. Additionally, when bending loads and movements (and corresponding deformations) are transmitted through the rotor shaft to the generator, it may not be possible to maintain a controlled air gap between generator rotor and generator stator. High bending loads can even cause structural damage to parts of the generator, e.g. its bearings. Replacement or repair of such generator parts may be very expensive due to the size and related cost of the generator and its components.

Also in the case of more integrated direct drive wind turbine designs, which lack a rotor shaft and which have a direct coupling between the hub or its blades and the generator's rotor (known from e.g. DE 10255745), the bending moments and deformations are directly transmitted from the hub to the rotor and/or the stator, making it more difficult to minimize air gap variations.

The cause of the transmission of the bending loads and deformations from the blades and hub to the generator lies in the wind turbine configuration. In most conventional wind turbines, the rotor hub is mounted on one end of the rotor shaft. The rotor shaft is rotatably mounted in a support structure within the nacelle on top of the wind turbine tower. The rotor thus forms an overhanging structure which transmits torque, but additionally transmits cyclical bending loads due to the loads on the blades and the weight of the hub and blades. These bending loads are transmitted to the generator (in the case of direct drive turbines) causing air gap variations.

DE 10 2004 030 929 discloses a direct drive wind turbine, wherein a generator is arranged in front of the wind turbine rotor, with the nacelle and tower arranged behind the wind turbine rotor. A rear portion of the generator rotor is coupled to the wind turbine rotor. One problem associated with this design is the introduction of bending loads in the generator rotor.

WO 01/59296 discloses a direct drive wind turbine comprising a hub with a plurality of blades, the hub being rotatably mounted relative to an axle part. The hub of the turbine is connected to the generator rotor by means of a plurality of connecting members, which are torsion stiff but yielding to bending moment.

With this kind of configuration the loads due to the weight of hub and blades are transmitted more directly via the frame to the tower, whereas the rotor transmits mainly torque to the generator, thus substantially reducing undesired deformations in the generator. This represents a major improvement with respect to other prior art wind turbines, but the transmission of bending loads from the rotor to the generator cannot be avoided entirely.

There thus still exists a need for a direct drive wind turbine, wherein the transfer of bending loads and movements from the rotor hub to the generator can substantially be reduced.

SUMMARY

Embodiments of the invention are defined by the claims below, not this summary. A high-level overview of various aspects of the invention are provided here for that reason, to provide an overview of the disclosure, and to introduce a selection of concepts that are further described in the Detailed-Description section below. This summary is not intended to identify key features or essential features of the claimed subject matter, nor is it intended to be used as an aid in isolation to determine the scope of the claimed subject matter.

In a first aspect, the invention provides a wind turbine comprising a rotor and a generator, the rotor comprising a rotor hub and one or more rotor blades and the generator comprising a generator stator and a generator rotor, wherein the hub is rotatably mounted on a frame, the generator rotor comprises a carrying structure carrying magnetic or electromagnetic elements, one or more circumferentially arranged substantially axial protrusions are attached to the rotor, wherein the axial protrusions extend into the generator rotor carrying structure, and one or more flexible couplings are arranged between one or more of the axial protrusions and the carrying structure.

In this aspect of the invention, the stiffness of the coupling between the rotor and the generator rotor with respect to loads other than torque may be reduced as compared to prior art systems. Torque from the hub may still be effectively transmitted to the generator rotor, but that the transmission of all other loads is substantially reduced. The provision of the protrusions which substantially extend between the generator rotor's carrying structure allows the distance between the rotor and generator to be reduced. This may reduce bending loads in the tower, because the rotor hub with blades can be positioned closer to the tower. This may also reduce the bending loads in the generator rotor carrying structure. In this sense, the mentioned "flexible couplings" are to be understood to be couplings that yield ("give in") relatively easily under loads. They may be made from any suitable material, e.g. elastic or elastomer materials, or combinations of metals with elastomers or yet other suitable materials. The couplings may obtain their flexible properties due to their shape, material, positioning, mounting or combinations of these.

In this aspect of the invention, imperfect alignment of the generator rotor with respect to the rotor hub may be absorbed by the flexible couplings due to the torsional flexibility of the coupling between generator rotor and rotor. Furthermore, a torsionally flexible coupling between rotor and generator rotor may reduce other problems related to e.g. vibrations.

In some embodiments, the axial protrusions are connected to or integrally formed with the rotor hub. In other embodiments, the axial protrusions are connected to or integrally formed with extenders mounted on the rotor hub. In yet further embodiments, the axial protrusions are connected to or integrally formed with one or more of the rotor blades. In these different embodiments, the rotor's protrusions may either be provided on the hub, on the blades or on the blades' extenders. An extender is an element arranged between the hub and the root of a rotor blade whereby the effective diameter of the rotor may be increased without increasing the blades' length. If the protrusions (and thus the couplings) are provided further away from the hub's rotational axis, the loads at each coupling may be lower. If the protrusions (and thus the couplings) are provided nearer to the hub's rotational axis, potential problems due to bending of the blades may be avoided.

In yet other embodiments, a coupling body is connected to the rotor hub, the coupling body comprising the axial protrusions. In these embodiments, the manufacture of the hub and other components may be simplified.

In some embodiments, the coupling body may be flexibly coupled to the rotor hub. In these embodiments, both at the connection rotor-coupling body and at the connection coupling body-generator rotor e.g. flexible couplings may be provided. The transmission of bending loads may thus further be reduced.

In some embodiments, the coupling body may comprise three rearwardly extending spokes. In principle, any number of connections (protrusions) may be provided between the rotor and the generator rotor. Three or more connection points have the advantage of being dynamically balanced.

In some embodiments, a single axial protrusion is attached to the rotor, the protrusion being substantially cylindrical. Optionally the single axial protrusion is flexibly connected to the rotor. In these embodiments, the protrusion may form an intermediate element between rotor and generator rotor and may be flexibly connected at either end.

In some embodiments, the axial protrusions extending into the generator rotor carrying structure extend to substantially the middle axial plane of the generator rotor. Bending loads in the generator rotor may thus be minimized.

In some embodiments, the flexible couplings may be elements of elastic and/or visco-elastic material. These flexible couplings thus derive their flexibility from the material from which they are made. The flexible materials may be elastic in the sense that their deformation is proportional to the applied load. They may also be visco-elastic in the sense that they exhibit time-dependent strain. Depending on the vibrations that generally occur in the wind turbine, application of elastic, visco-elastic or combinations of these may be beneficial. Optionally, the flexible elements may be pre-loaded: the elements are compressed between the protrusions and spokes, so that they cannot go loose during operation of the wind turbine. Optionally, the stiffness of at least one of the flexible elements is different from the stiffness of at least another of the flexible elements. In some embodiments, the couplings comprise elements of flexible materials, the elements incorporating a hydraulic chamber through which the stiffness or flexibility of the elements may be modified. Examples of such elements are e.g. described in EP 1 566 543.

In some embodiments, the flexible couplings may be provided in pairs, the pairs forming double-sided couplings between the axial protrusions and the generator rotor carrying structure. In other embodiments, the flexible couplings may form one-sided couplings between the axial protrusions and the generator rotor carrying structure. One-sided couplings may generally be easier to install than double-sided couplings. On the other hand, double-sided couplings may perform better under reverse loads.

In some embodiments, the generator rotor's radial carrying structure comprises one or more substantially radial struts and wherein the one or more flexible elements are arranged between one or more of the axial protrusions and the radial struts. Any other suitable radial carrying structure may however also be used.

Optionally, one or more of the substantially radial struts are each connected to a pair of the protrusions. Another option is that each protrusion is connected to a pair of the substantially radial struts.

In yet other embodiments, individual struts are connected to only a single protrusion. As mentioned before, these embodiments may be relatively easily assembled. However, the embodiments with spokes between pairs of protrusions or with protrusions between pairs of spokes may perform better under reverse loads.

In some embodiments, the generator rotor may be arranged radially outside of the generator stator. In other embodiments, the generator stator may be arranged radially outside of the generator rotor. Within the scope of the invention, even other embodiments are possible, e.g. configurations wherein the generator rotor and stator are axially arranged with respect to each other.

DESCRIPTION OF THE DRAWINGS

Particular embodiments of the invention will be described in the following, only by way of non-limiting examples, with reference to the appended drawings, in which.

DETAILED DESCRIPTION

The subject matter of select embodiments of the invention is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described.

Figure 1:
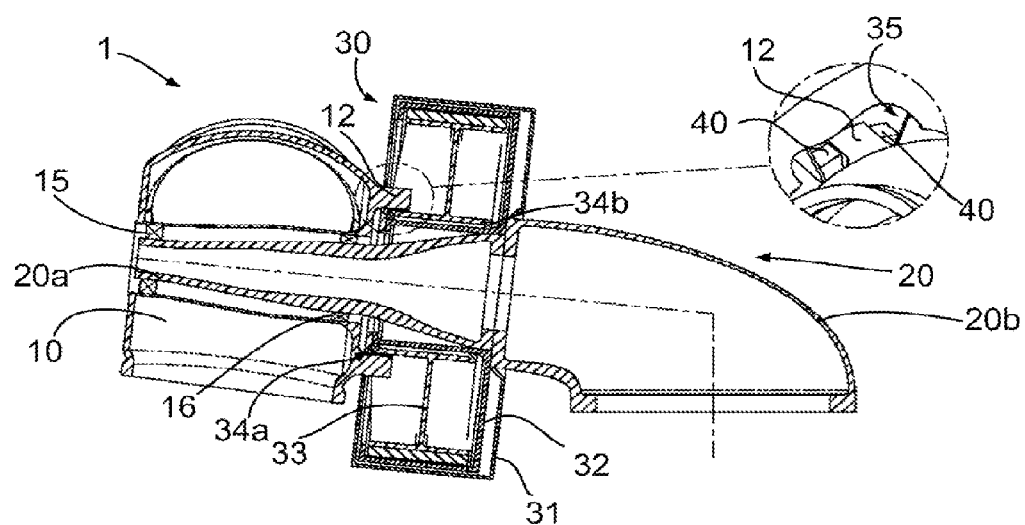
FIG. 1 illustrates a first wind turbine in accordance with an embodiment of the invention.

FIG. 1 illustrates a first embodiment of a wind turbine according to the invention. Wind turbine 1 comprises a hub 10 carrying a plurality of blades (not shown). The roots of the blades are directly attached at the hub. Hub 10 is rotatably mounted on a front frame 20a through suitable bearings 15 and 16. A generator 30 is also mounted upon the front frame 20a. The generator 30 comprises a generator stator 32 and a generator rotor 33, arranged within generator housing 31. Generator rotor 33 is rotatably mounted with respect to the generator stator through bearings 34a and 34b. Front frame 20a is further connected to a rear frame 20b, which is mounted on top of the wind turbine tower (not shown).

In this embodiment, hub 10 comprises a plurality of protrusions 12 integrally formed with the hub. The generator rotor 33 comprises (electro) magnetic elements, which is carried by carrying structure 35. The protrusions 12 extend into the generator 30 and are connected to the generator rotor's carrying structure 35 through flexible elements 40. In FIG. 1, a detailed view of this connection is also shown. A single protrusion has a double-sided connection to the carrying structure 35 of the generator rotor by two flexible elements 40.

The arrangement of the flexible elements ensures that the transmission of bending loads from the hub to the generator is reduced. The flexible elements namely allow a relative displacement between the rotor hub and the generator rotor. In this embodiment shown, the relative displacement is mostly in the axial direction, but also slightly in the circumferential direction. Also in this aspect of the invention, the rotor hub and generator can be positioned closely together, thus reducing the distance of the rotor hub to the wind turbine tower and bending loads in the tower.

In the embodiment shown, the flexible couplings are elements of relatively flexible materials. The flexible material elements may be elastic or visco-elastic. Depending on the vibrations that generally occur in the wind turbine, application of elastic, visco-elastic or combinations of these may be beneficial. An aspect of couplings consisting of flexible material elements is that they may be easy to manufacture, and install and may not require a lot of maintenance.

Figure 2:
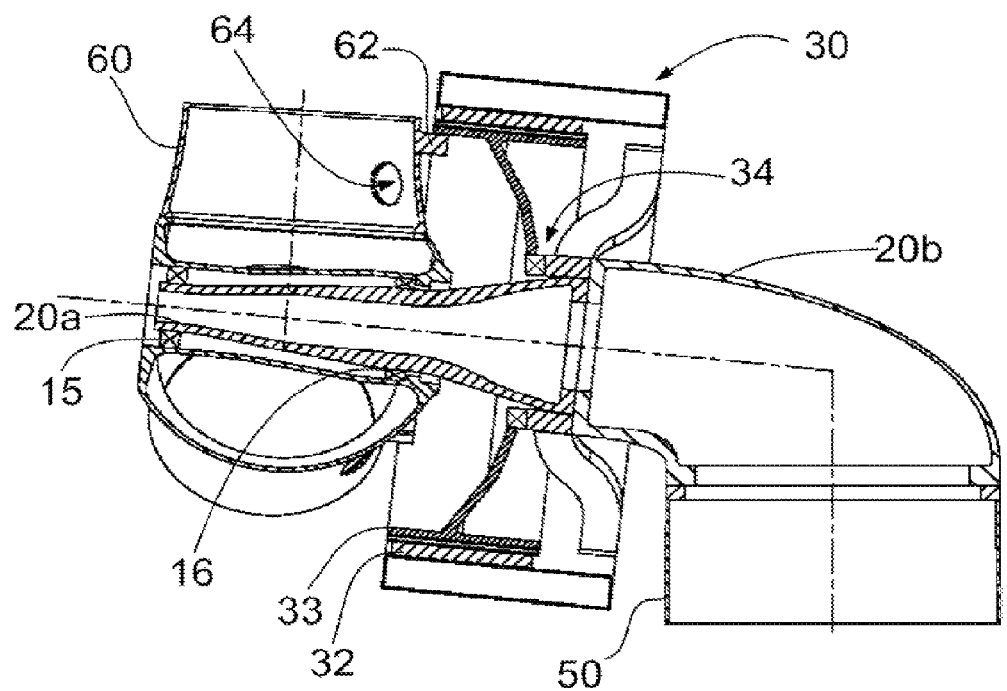
FIG. 2 illustrates a second wind turbine in accordance with an embodiment of the invention.

FIG. 2 illustrates a second embodiment of a wind turbine according to the invention. In this embodiment, the hub carries a plurality of extenders 60. An extender is an element that serves to increase the rotor diameter without increasing the rotor blade length. The roots of the blades are thus mounted in the extenders, not directly in the hub.

The embodiment of FIG. 2 is different from the embodiment of FIG. 1, in various other aspects: protrusions 62 extend from the extender 60 into the generator rotor. These protrusions may be formed integrally with the extenders or may be separate components attached to the extender. Also, generator rotor 33 is rotatably mounted upon generator stator 32 through a single bearing 34 (instead of two bearings as was shown in FIG. 1). Further, extenders 60 may comprise one or more inspection holes 64, facilitating the inspection, maintenance, and installation of the flexible elements connecting the protrusions 62 to the generator rotor. By providing the protrusions (and thus the connections with the rotor) further away from the hub's rotational axis, the loads at each connection point can be reduced.

A further effect of the provision of the protrusions further away from the rotor's rotational axis is that the front of the generator housing 31 will be more open to its environment. In order to avoid excessive wear, the generator may need to be protected with suitable measures.

Another difference with respect to the embodiment of FIG. 1 is that the generator stator 32 is mounted on rear frame 20b. It will be clear that the mounting of the stator with respect to frame 20 may be varied.

Figure 3A:
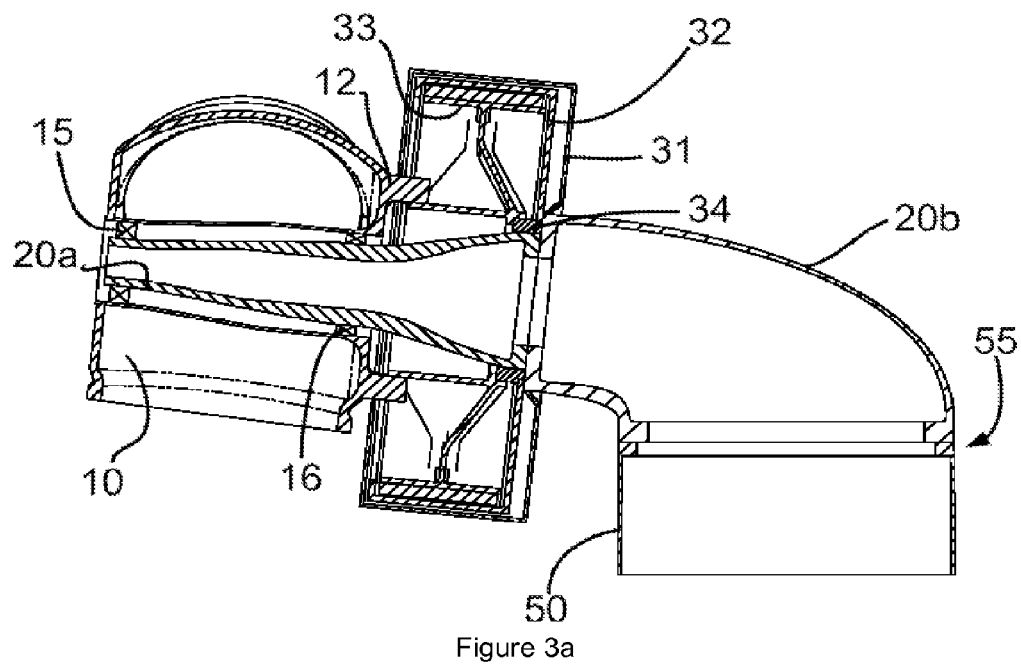
FIGS. 3a-3b schematically illustrate further embodiments of the invention.
Figure 3B:
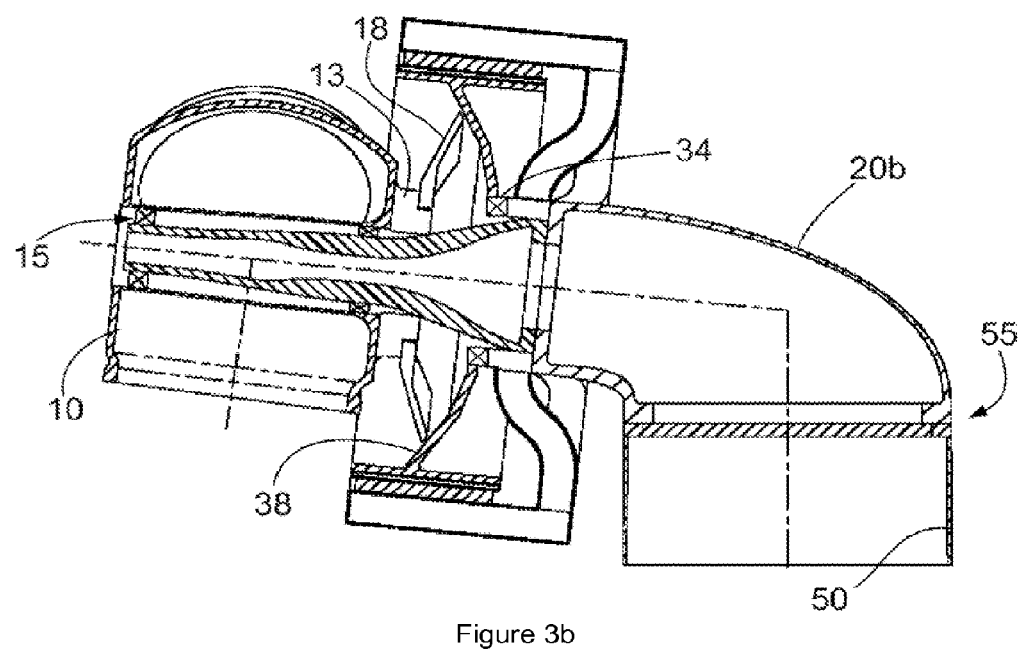

FIGS. 3a and 3b schematically illustrate further embodiments of the invention. In FIG. 3a, a single bearing 34 is once again provided between the base of the generator rotor 33 and the base of the generator stator 32. The protrusions 12 are arranged directly at the hub. The generator housing 31 is almost completely closed. A forward part of the generator rotor carrying structure is connected to the protrusions 12. Also shown schematically in FIG. 3a is wind turbine tower 50. Reference sign 55 indicates the presence of a yaw mechanism allowing rear frame 20b to rotate with respect to the tower's longitudinal axis.

In the embodiment of FIG. 3b, a coupling body 13 is attached to hub 10. The coupling body 13 substantially comprises a plate with a plurality of substantially radially extending spokes 18. The distal ends of these spokes 18 protrude into a generator rotor carrying structure and are connected to this carrying structure through flexible elements. In this embodiment, the connection between the hub and rotor is thus arranged more rearward than in the embodiments previously shown. Another aspect of a separate coupling body attached at the hub is that the hub may have a simpler design which may be easier to manufacture. The coupling body may be removably attached (using e.g. a bolted connection) to the hub. Such an attachment may in some cases facilitate installation and maintenance.

In FIGS. 1-3, the generator stator 32 is attached to frame 20 in a plane substantially perpendicular to the rotor's rotational axis, whereas the generator rotor is rotatably mounted on the generator stator. These kinds of arrangements are generally preferred for the following reasons: bending deformations experienced by the frame may vary particularly along the rotor's rotational axis (i.e. the frame's longitudinal axis). However, in a plane perpendicular to the rotational axis, these deformations will vary to a much lesser extent. Deformations of the frame will thus generally lead to a displacement (but not to a deformation) of the stator. Additionally, there is no direct contact between the generator rotor and the frame; the generator rotor is rotatably mounted on a part of the stator instead. In this aspect of the invention, the generator rotor will thus experience the same displacement as the generator stator. This may improve the air gap stability, since there is no relative displacement of the generator rotor with respect to the generator stator.

Figure 4A:
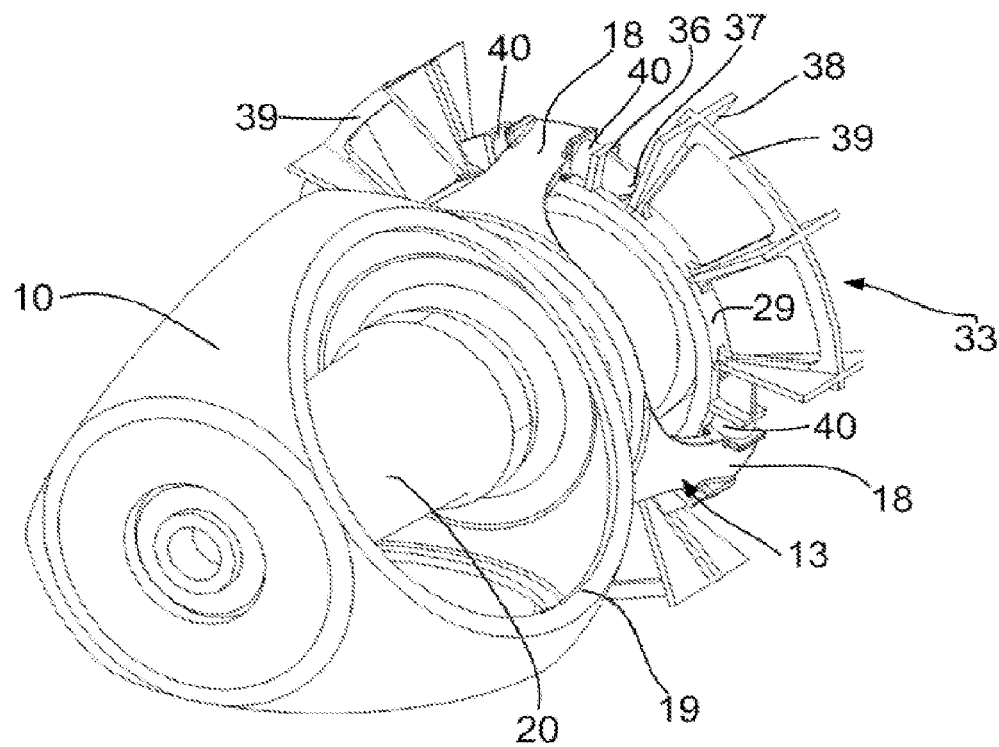
FIGS. 4a-4c schematically illustrate details of two wind turbines in accordance with embodiments of the invention.
Figure 4B:
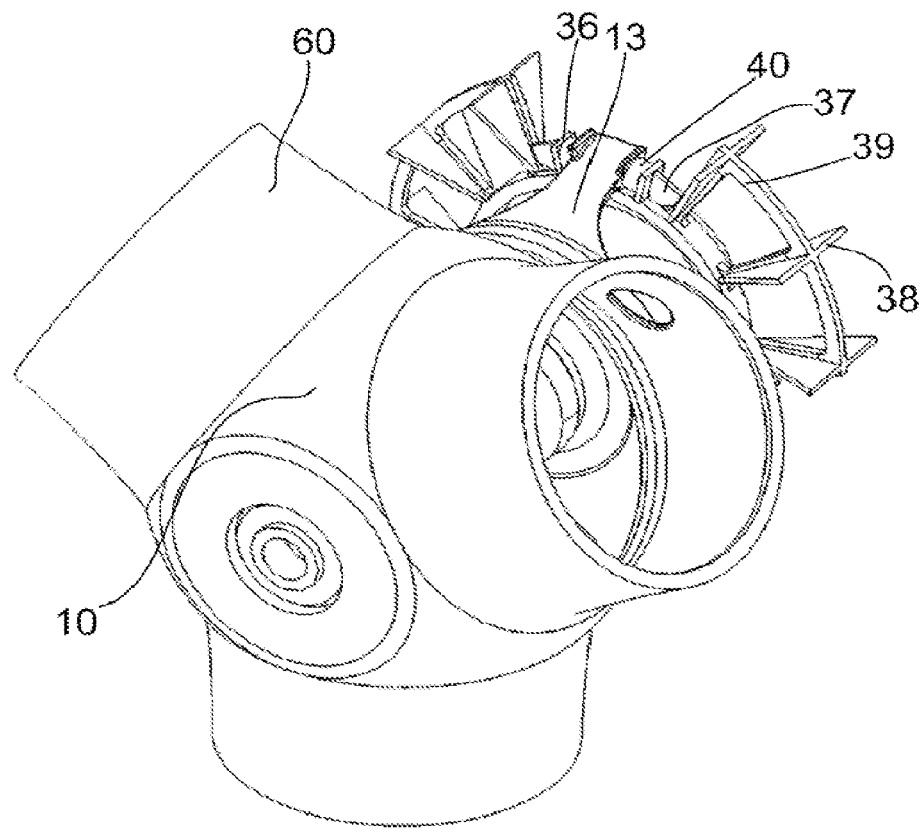

FIGS. 4a and 4b show examples of embodiments comprising similar coupling bodies. In FIG. 4a, three blades may be directly attached at fittings 19 in the hub. In FIG. 4b, three blades may be attached at suitable extenders 60. In both the embodiments, a coupling element 13 comprising three spokes is shown. In other embodiments, the number of spokes may be varied and may be e.g. two, or four, five or six. One possible carrying structure of the generator rotor carrying (electro)magnetic means is also shown.

The generator rotor carrying structure comprises an annular base element 29 which is rotatably mounted with respect to a generator stator (not shown). A number of radially extending struts 38 connect the annular base 29 to a segmented outer annular structure 39. Along three sections of the circumference of the structure, no struts or annular structure is provided. The distal ends of spokes 18 extend into these open sections. Flexible couplings 40 (also in this embodiment indicated as flexible material elements) are arranged between the distal ends of spokes 18 and substantially radial plate elements 36. These radial plate elements 36 are connected to struts 38 through circumferential elements 37.

Figure 4C:
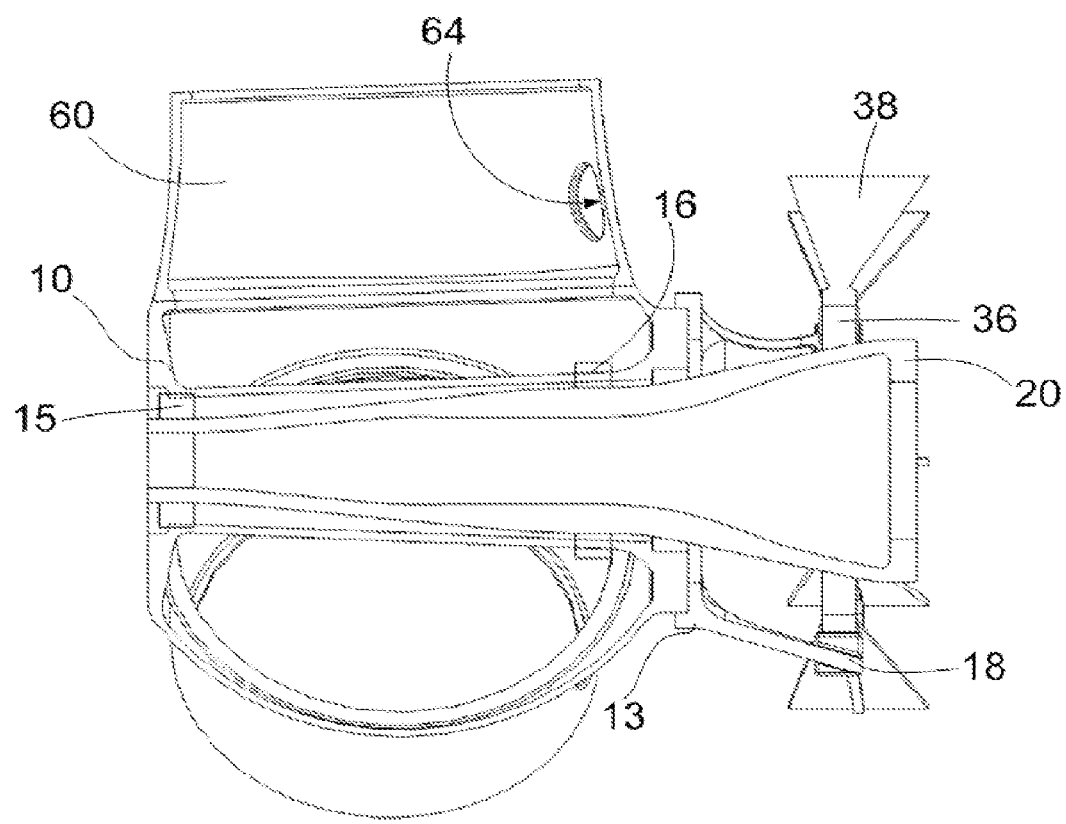

FIG. 4c is a cross-sectional view of the embodiment of FIG. 4b. The same elements may be recognized. In the embodiments shown, struts 38 are formed as substantially flat trapezoidal elements, but in other embodiments, this shape may vary. In general, the carrying structure of the generator rotor carrying e.g. permanent magnets or coils may be varied in accordance with specific load cases expected during the life-time of the generator.

Figure 5A:
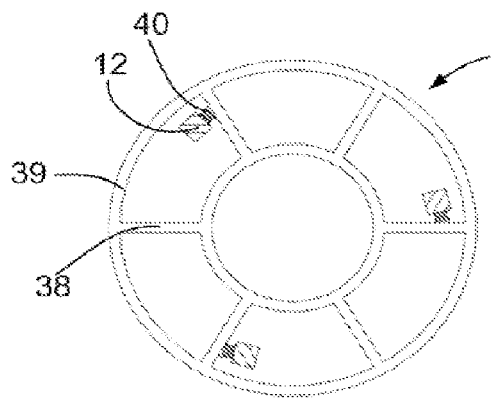
FIGS. 5a-5d schematically illustrate a number of ways of connecting protrusions to radial spokes of the generator rotor in accordance with embodiments of the invention.
Figure 5B:
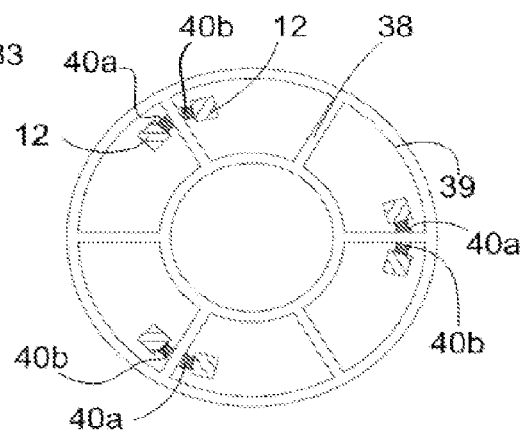
Figure 5C:
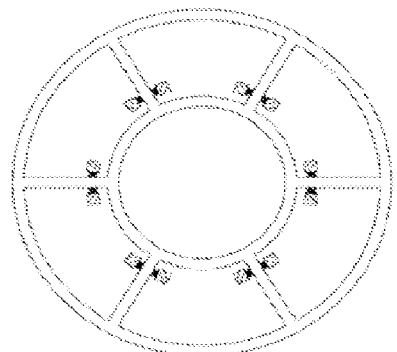
Figure 5D:
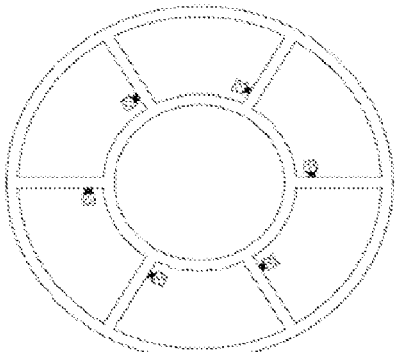

FIGS. 5a-5d schematically illustrate a number of ways of connecting protrusions to radial struts (or similar elements) of the generator rotor according to embodiments of the invention. In FIGS. 5a and 5d a one-sided connection is shown: a flexible coupling 40 is arranged between a protrusion 12 and a strut 38 of a radial carrying structure. In FIGS. 5b and 5c a double-sided connection is shown: a single radial strut 38 is connected through flexible couplings 40a and 40b to a pair of protrusions 12, one on either side of the struts. In yet further embodiments, a single protrusion can be connected with a double-sided connection to a pair of spokes.

An aspect of the one-sided connection is that the installation of the flexible couplings may be easier and that the arrangement may be cheaper. However this kind of arrangement may require an additional structure to be able to support reverse loading. An aspect of the double-sided connection is that it inherently also behaves well under reverse loading. In accordance with circumstances, a suitable arrangement may be selected.

In the various embodiments shown using flexible elements, the flexible elements may each comprise a hydraulic chamber. In preferred embodiments, the flexible elements that are compressed by the wind turbine rotor torque (elements 40b in FIG. 5b, assuming a clockwise rotation) may be connected to a common hydraulic circuit, such that radial loads are equally divided between the various struts and protrusions. Similarly, the flexible elements that are being decompressed by the wind turbine rotor torque (elements 40a assuming a clockwise rotation) may also be connected to another common hydraulic circuit, such that also these loads are equally divided. This kind of configuration allows the reduction of radial loads (due to the equalization of loads between various struts and protrusions) transmitted from the hub to the generator rotor which may be caused e.g. by radial misalignment of the axes of the generator rotor and wind turbine rotor.

In some implementations, the hydraulic circuits of the flexible elements may be actively controlled to influence e.g. the torsional eigenfrequency of the drive train or to counteract vibrations using active damping or reduce load peaks by releasing hydraulic fluid from such circuits.

Figure 6A:
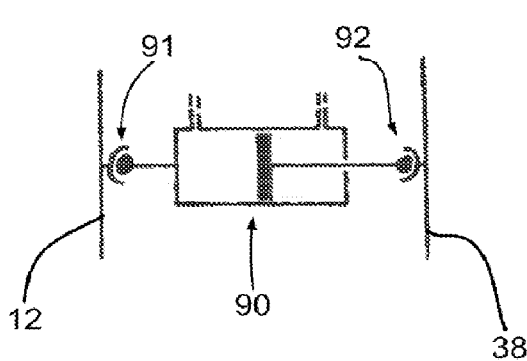
FIGS. 6a to 6c schematically illustrate some examples of couplings which may be used in accordance with embodiments of the invention.
Figure 6B:
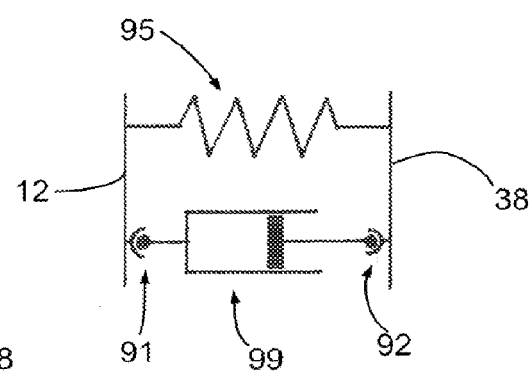
Figure 6C:
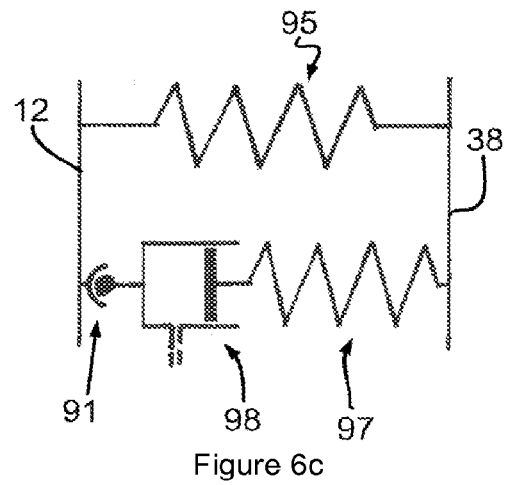

FIGS. 6a-6c schematically illustrate further possible flexible couplings which may be used in embodiments of the invention. In FIG. 6a, a hydraulic system 90 is connected between a protrusion 12 from the hub and e.g. a radial strut 38. Suitable ball and socket joints 91 and 92 may be provided at its connections to the protrusion 12 and radial strut 38. Such ball and socket joints allow relative displacement between strut 38 and protrusion 12 perpendicular to the main axis of the hydraulic system. The hydraulic system itself allows relative displacements along its main axis. In some embodiments, all hydraulic systems arranged to couple the rotor hub to the generator rotor are connected to the same pressure group, so that loads are evenly distributed between all couplings. The hydraulic system 90 may be passive, but in other embodiments may also be active, or semi-active. In these embodiments, the rigidity of the flexible couplings may be controlled e.g. in accordance with certain variables measured during the operation of the turbine. In some embodiments, the rigidity of couplings may be varied e.g. in response to a varying wind speed.

FIG. 6b illustrates a flexible coupling comprising a spring 95 with a coupled damper 99. Suitable ball and socket joints are arranged at either end of the damper 99.

FIG. 6c illustrates a flexible coupling, wherein a rotor protrusion 12 and a radial strut 38 are coupled to each other via a spring 95 and by an elastic element 97 coupled in series with a hydraulic circuit.

In further embodiments of the invention, a flexible coupling just consisting of a spring may be provided. In yet further embodiments, the couplings illustrated in FIGS. 6a-6c may be combined with e.g. flexible material elements. Although the embodiments shown in FIGS. 5 and 6 are explained with reference to a connection between a protrusion 12 from the rotor and a substantially radial strut 38, it will be clear that similar couplings may also be provided between protrusions and different parts of a generator rotor carrying structure even if the generator rotor carrying structure does not comprise such radial struts.

Figure 7:
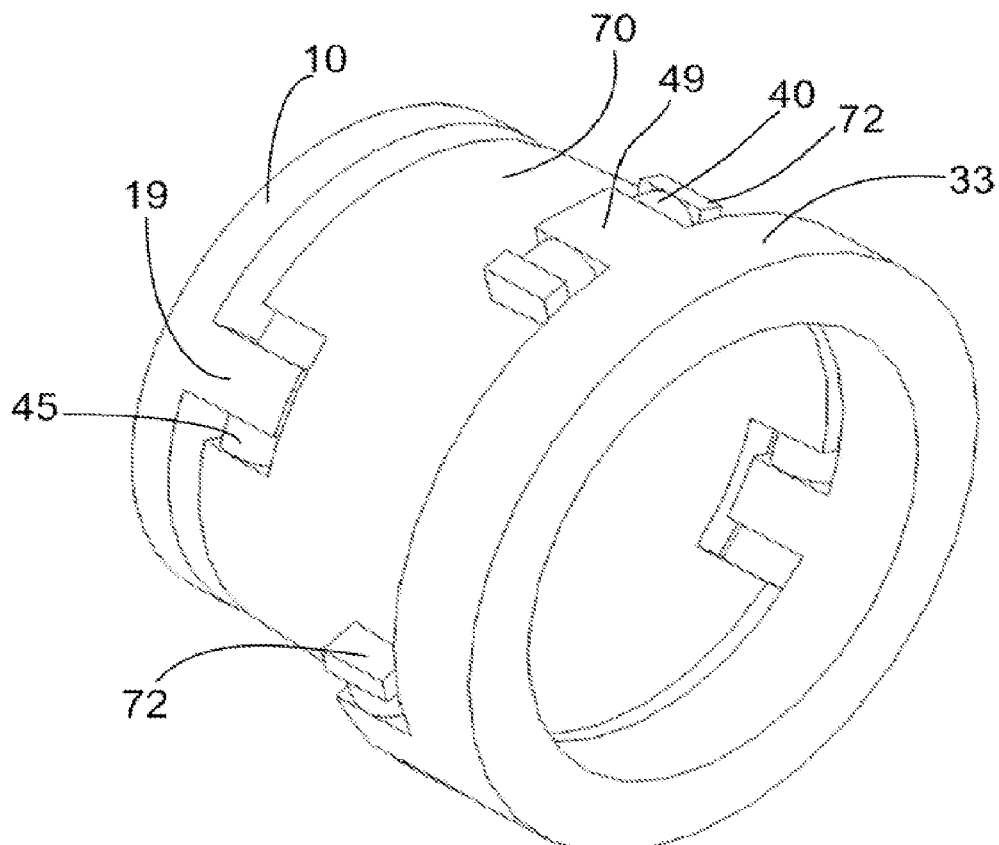
FIG. 7 illustrates an embodiment of a coupling body which may be used in accordance with an embodiment of the invention.

FIG. 7 illustrates an embodiment of a coupling arrangement which may be used in embodiments of the invention. A cylindrical protruding element 70 is connected to the hub 10. To that end, the hub is provided with fingers 19 and flexible elements 45 are connected to the fingers in cut-outs of cylindrical protruding element 70. The coupling of cylinder 70 to the hub is thus flexible.

At the other end of the cylindrical element 70, a similar flexible coupling is provided: flexible elements 40 connect tabs 72 formed on cylinder 70 to fingers 49 provided on generator rotor 33.

In other embodiments, protruding fingers 49 may instead be provided on cylindrical protrusion 70 and fit into cut-outs of the generator rotor.

The invention is not limited in any way to the kind of bearings used to mount the hub on the frame or to mount the generator rotor on the generator stator. Suitable fluid bearings, particularly hydrodynamic or hydrostatic bearings, may be employed. Alternatively, suitable rolling element bearings, such as e.g. roller bearings, double-tapered roller bearings, or ball bearings may also be used. The bearings may further be purely radial bearings or radial and axial bearings.

The invention is furthermore not limited in any way to the kind of generator employed in the wind turbine. Any suitable kind of synchronous or asynchronous generator may be used. In one preferred embodiment of the invention, the generator rotor is provided with permanent magnets.

Also the frame supporting the rotor hub and generator may be formed of one integral part or may comprise two or more separate parts. The frame comprising a plurality of separate parts may have advantages for the installation of the wind turbine. The frame may furthermore be of any suitable shape and configuration: the frame may e.g. have a circular, elliptical, rectangular or other cross-section. The frame may be a forged component but may also be formed by e.g. a plurality of beams or a suitable truss structure.

Although this invention has been disclosed in the context of certain preferred embodiments and examples, it will be understood by those skilled in the art that the invention extends beyond the specifically disclosed embodiments to other alternative embodiments and/or uses of the invention and obvious modifications and equivalents thereof. Thus, it is intended that the scope of the invention herein disclosed should not be limited by the particular disclosed embodiments described before, but should be determined only by a fair reading of the claims that follow.

We claim:

1. A wind turbine comprising
   a rotor that includes a rotor hub and one or more rotor blades, the rotor hub being rotatably mounted on a frame;
   a generator that includes a generator stator and a generator rotor, the generator rotor including a carrying structure that carries magnetic or electromagnetic elements,
   one or more circumferentially arranged substantially axial protrusions are attached to the rotor, the axial protrusions extending into the generator rotor carrying structure to substantially a middle axial plane of the generator rotor, and
   one or more flexible couplings arranged between one or more of the axial protrusions and the carrying structure.

2. The wind turbine according to claim 1, wherein the axial protrusions are connected to or integrally formed with the rotor hub.

3. The wind turbine according to claim 1, wherein the one or more blades are connected to the rotor hub with extenders, and the axial protrusions are mounted on or integrally formed with the extenders.

4. The wind turbine according to claim 1, wherein the axial protrusions are mounted on or integrally formed with one or more of the rotor blades.

5. The wind turbine according to claim 1, wherein one or more of the flexible couplings comprise flexible elements made of flexible materials.

6. The wind turbine according to claim 5, wherein one or more of the flexible elements are of elastic material.

7. The wind turbine according to claim 5, wherein one or more of the flexible elements are of visco-elastic material.

8. The wind turbine according to claim 5, wherein one or more of the flexible elements comprise a hydraulic chamber.

9. The wind turbine according to claim 8, wherein the one or more flexible elements comprising a hydraulic chamber are connected by one or more hydraulic circuits.

10. The wind turbine according to claim 5, wherein a stiffness of at least one of the flexible elements is different from a stiffness of at least another of the flexible elements.

11. The wind turbine according to claim 1, wherein a stiffness of the flexible couplings can be actively or semi-actively controlled.

12. The wind turbine according to claim 1, wherein the flexible couplings comprise a damping system.

13. The wind turbine according to claim 1, wherein the flexible couplings comprise springs.

14. The wind turbine according to claim 1, wherein the generator rotor's carrying structure comprises one or more substantially radial struts and wherein the one or more flexible couplings are arranged between one or more of the axial protrusions and the radial struts.

15. A wind turbine comprising
    a rotor that includes a rotor hub and one or more rotor blades, the rotor hub being rotatably mounted on a frame;
    a generator that includes a generator stator and a generator rotor, the generator rotor including a carrying structure that carries magnetic or electromagnetic elements,
    a coupling body connected to the rotor hub and comprising substantially rearwardly and radially extending spokes, and
    one or more flexible couplings for coupling distal ends of the spokes to the generator rotor carrying structure.

16. The wind turbine according to claim 15, wherein the coupling body is flexibly coupled to the rotor hub.

17. The wind turbine according to claim 16, wherein each of the flexible couplings comprise flexible elements made of flexible materials.

18. The wind turbine according to claim 17, wherein one or more of the flexible elements are of elastic material.

19. The wind turbine according to claim 17, wherein one or more of the flexible elements are of visco-elastic material.

20. The wind turbine according to claim 19, wherein one or more of the flexible elements comprise a hydraulic chamber.

* * * * *